May 21, 1957 — A. B. ELLISON — 2,792,992
COMPUTERS
Filed May 9, 1950

Inventor: Arnold B. Ellison

United States Patent Office 2,792,992
Patented May 21, 1957

2,792,992

COMPUTERS

Arnold B. Ellison, New York, N. Y.

Application May 9, 1950, Serial No. 160,863

15 Claims. (Cl. 235—79.5)

This invention relates to improvements in computers, and more particularly pertains to cylindrical slide-rule computers adapted to serve as calculating, measuring, writing, drawing, and magnifying implements.

Engineers, draftsmen, technicians, and others practicing the mechanical arts frequently find it necessary to perform sequentially some or all of a series of related operations involving the employment of a reading magnifier, a linear scale, a slide rule, a writing and drawing implement, and an eraser. For example, to estimate in the field the quantity and weight of material required in a replacement shaft sleeve, the specific weight of the material is read with a magnifier from a handbook and written down. The old sleeve is examined under magnification for wear, porosity, labeling, etc. Then its inside and outside diameters are measured by scaling and its length is measured with a depth gauge and noted down. From these written and measured figures the volume and weight of the piece is calculated on a slide rule. Then a sketch or working drawing is drawn, with incidental use of the eraser, to record the information.

In the past the need for these operations was generally met in one of two ways. Either a separate instrument was employed for each distinct function, or several units were used, some of which possessed a few of the required instruments in combination.

The former practice has obvious disadvantages of undue expense in acquiring all the required instruments, in cumbersomeness, slowness and difficulty in manual manipulation of the several instruments successively, particularly in maintaining availability when needed in the field, and bulk in storage and inconvenience for portability. The latter arrangement has, in the past, involved a sacrifice in accuracy and facility in use that is not compensated for by the increase in compactness and portability, with but a few of these related functions embodied in any single instrument.

Previous attempts at writing computers, besides constructional and fabricating complexity, also were limited in operation by their use of involved special or split-scale arrangements or short, low-accuracy scales, total obstruction of writing function at some scale settings, or end and rotary restrictions which limited the choice and type of scales used and required frequent undesirable resetting operations.

The primary object of this invention is to provide a simply fabricated, compact, pocket-portable computer adapted to perform selectively any or all of the related operations of reading magnification, linear measurement (including gauging of depth), slide-rule calculation, writing, drafting, or erasing.

Another object is to provide a computer of the character described wherein the writing implement portion is unobstructed and available for use at any calculation setting of the device.

A further object is to provide a computer of the character described having integral, or preferably readily and facilely replaceable and reversible component elements, to thereby increase the scope and flexibility of use of the device.

A still further object is to provide a computer of the character described that permits sequential multifold mathematical operations on the slide rule portion without resetting, by affording unrestricted end motion between the slidable and fixed scale members.

An additional object is to provide in a computer of the character described a self-springing construction which permits sliding frictional contact between members without the need for separate spring components.

Another object is to provide in a computer of the character described unrestricted end and rotary motion for the slidable scale member, so that a plurality of longitudinally-arranged or helically-arranged scales, or a related combination of both, can be employed, thus multiplying the accuracy, utility, and flexibility of the device.

A further object is to provide a computer of the character described in which the evenly decimally calibrated logarithm equivalent scale from zero to ten on one member can be made of standard length to serve as a linear measuring scale, which in telescoping conjunction with a like scale on another member can act as a longer measuring scale, while the functions of numerical addition and subtraction may also be performed thereon or upon fractionally subdivided similar scales, thru slidable cooperation between said calibrated scales, independently of their linear values.

A further object is to provide in a computer of the character described, a shiftable cursor of both vertical and horizontal magnifying configuration adapted to function also as a reading magnifier, a depth gauge index, and a pocket clasp for the computer, to which it can hold claspingly and frictionally thru its spring acting shape.

Other objects and many of the attendant advantages of this invention as well as of its construction, arrangement, and operation will be apparent from the following description, considered with the accompanying drawing, in which Fig. 1 is a plan view of a computer, showing a preferred embodiment of the invention;

Similar numerals refer to similar parts throughout the several views.

Figures 1, 2, 3, 4, 5, 6, 7A, 7B, 7C, 8, 9:
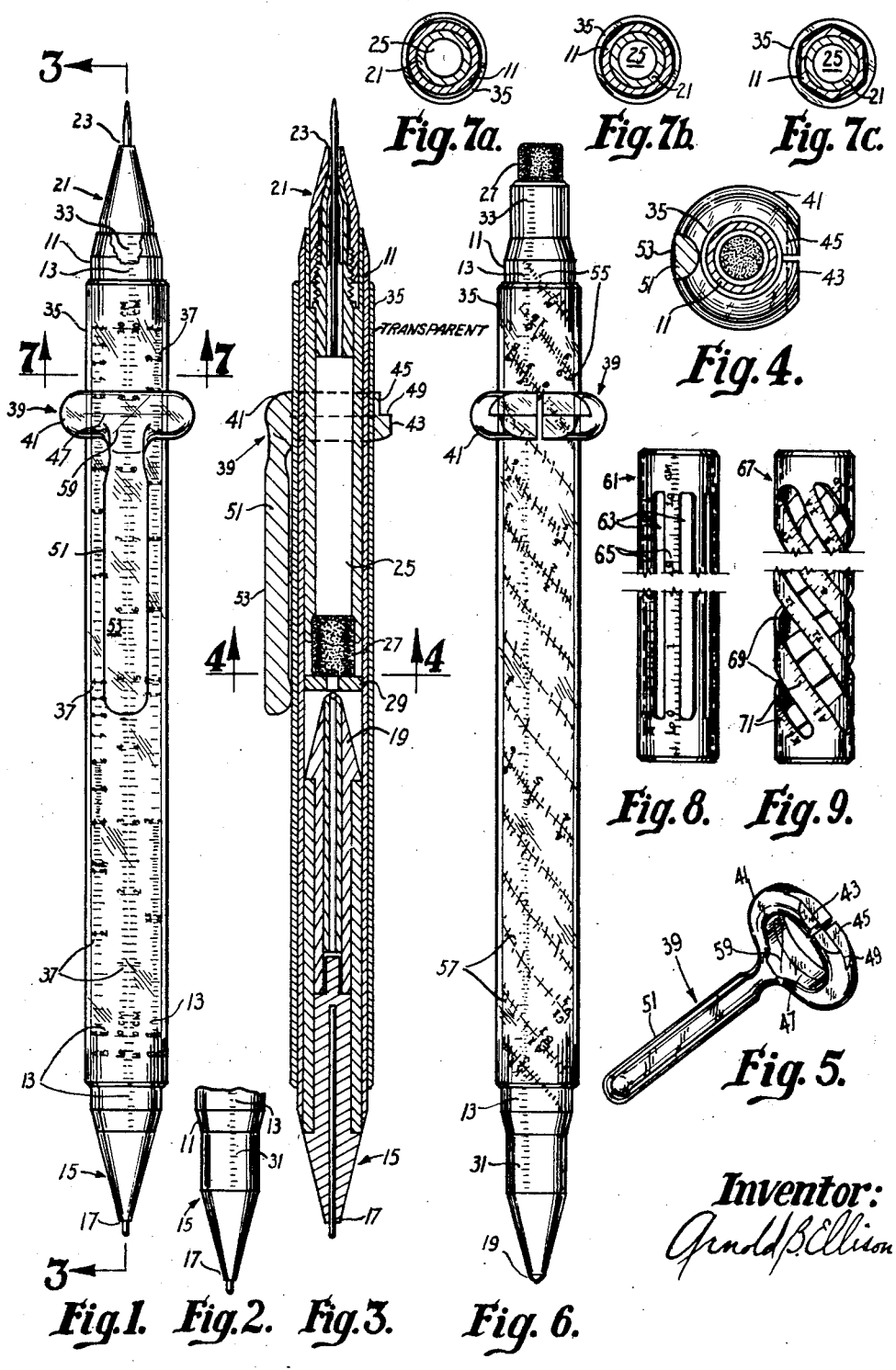
Fig. 2 is a fragmentary view of the lower portion of Fig. 1, shown in an extended position.
Fig. 3 is a section taken on line 3—3 of Fig. 1.
Fig. 4 is a section taken on line 4—4 of Fig. 3.
Fig. 5 is a perspective view of the cursor.
Fig. 6 is a plan view of a modified form of the invention.
Fig. 7a is a section taken on the line 7—7 of Fig. 1.
Figs. 7b and 7c are sections taken on the line 7—7 of Fig. 1, showing further modified forms of the invention.
Fig. 8 is a broken view of a modified form of outer tube 35 of Fig. 1.
Fig. 9 is a broken view of a modified form of the outer tube 35 of Fig. 6.

In the preferred embodiment of the invention shown in Figs. 1, 3, 4, 5, and 7a, there is provided a rod or tube 11. Said tube is preferably opaque, and has marked, inscribed, or laminated upon its peripheral surface a plurality of scales 13, running longitudinally of the instrument. Any suitable scales, such as straight, direct, inverted, arithmetic, logarithmic, exponential, trigonometric, linear measurement in inches and centimeters, and specialized, colored, coded, or tabulated scales and markings can be included. A first writing instrument 15 having a mechanical pencil 17 at one end and a fountain pen 19 at the other end is carried preferably slidably, rotatably and reversibly in the tube 11, said instrument being held frictionally or interlockingly by said tube and extending beyond an end thereof, as shown in Figs. 1 and 3.

A second writing instrument 21 having preferably a chuck type draftsman's and artist's scribing-pointed pencil 23 at one end, a chamber 25 for carrying leads, and an eraser 27 at the other end is carried slidably, rotatably and reversibly in the tube 11, said instrument being held frictionally or interlockingly by said tube and extending beyond the other end thereof, as shown in Figs. 1 and 3. Disc 29 may be secured in tube 11 to provide a limit stop in the insertion of writing instruments 15 and 21.

The writing instruments 15 and 21, which may differ also in writing color, have selected scales 31 (Fig. 2) and 33 respectively marked or inscribed on their peripheral surfaces, longitudinally thereof, to provide additional or supplemental extendable scales for use independently or in conjunction with the scales 13 and the scales hereinafter described.

Transparent tube 35 has marked, inscribed, or laminated upon or near its outer or inner surface—preferably the latter—a plurality of scales 37, each extending longitudinally. Said tube is carried slidably, rotatably and reversibly on tube 11, in frictional engagement therewith, and by means of the construction shown permits alignment of selected scales 13 and/or 31 and/or 33 with selected scales 37 throughout substantially the entire length of each such scale, so as to give sliding and rotatable extendable mathematical or measuring relation between or among selected scales, in the manner known with respect to conventional slide-rules, scales, and like instruments.

The combination magnifier, clasp and magnifying cursor 39 comprises a transparent, magnifying, substantially torus-shaped clamp body 41 having a flat 43 on a portion thereof, and a notch 45 in said flat. The toroidal shape provides both vertical and horizontal magnification. Said clamp body is split at the mid-point of said flat and, having an inside diameter equal to or slightly less than the outside diameter of tube 35 and being resilient, engages tube 35 frictionally, yet is slidable and rotatable relative to said tube.

Datum line or index 47 is marked or inscribed on the inner periphery of clamp body 41, parallel to the plane of the ring defined by said clamp body so that said index is maintained normal to the longitudinal axes of tubes 11 and 35 and writing instruments 15 and 21. Said index also lies in the plane of surface 49 of notch 45, so that the instrument can be used as a depth guage, using linear scales which are related to its ends.

Transparent, magnifying-reading clasp 51 is preferably integral and dependent from clamp body 41, and extends substantially parallel to tube 35 to provide therewith a means for clipping the instrument in a pocket or other container. When shifted relative the instrument beyond an end thereof, said clasp 51 can be placed with its flat outer side 53 against reading matter or data to magnify the same.

The complete freedom of tube 35 to rotate and to slide longitudinally relative tube 11 permits the use of a plurality of scales on said members, and makes facile the alignment and registry of selected scales of said members, each such use maintaining at least one of the writing instruments in operative position, whereby an intermediate reading in a series calculation can be noted without disturbing the setting from which such calculation has been read. In addition, such freedom permits the use of the modified form of the invention shown in Fig. 6, wherein the tube 11 is marked or inscribed separately or additionally with a plurality of helically arranged scales 55 and the tube 35 is marked or inscribed separately or additionally with a plurality of helically arranged scales 57, the scales 55 and 57 being optionally in distinguishing color, and having the same or mathematically related pitch relative each other or some of straight scales 13 and 37, to assure registry and alignment in use. It is apparent that, for a given length of tubes 11 and 35, the employment of helically arranged scales in lieu of straight line scales affords greater scale length and corresponding increase in the accuracy of the instrument beyond the increased accuracy provided by the magnifying cursor body 41. It is also apparent that the use of helical and straight scales relative each other affords application to a wide field of mathematical functions, in novel practical use.

Where helical scales are employed, an additional or separate datum line or index 59 is marked or inscribed on the inner periphery of clamp body 41 normal to the direction of such scales. Alternately, datum line 47 can be employed by giving a selected helical scale or scales a suitable lead.

While a snug fit between tubes 11 and 35 provides suitable frictional restraint against slippage therebetween, improved gripping action can be obtained by giving tube 35 a slight elliptical or multi-sided distortion from true circular cross-section, as shown in Fig. 7a, thereby providing side springing friction about circular section of tube 11. Conversely, by giving tube 11 a slight elliptical or multi-sided distortion from true circular cross-section, as shown in Fig. 7b, side springing friction about circular tube 35 obtains. Alternatively tubes 11 and 35 can be polygonal in cross-section, as shown in Fig. 7c.

The preferred transparent tube 35 with longitudinal scales 37 can be effectively modified and supplanted, as shown in Fig. 8, by an opaque tube 61 having longitudinal slots 63 which are marked or inscribed along or outside their edges with a plurality of longitudinal scales 65, so that scales 13 visible thru said slots can be aligned to work with scales 65.

Similarly transparent tube 35 with helical scales 57 may be modified and replaced, as shown in Fig. 9, by an opaque tube 67 having helically-arranged slots 69, which are marked or inscribed along or outside their edges with a plurality of helical scales 71, so that scales 55 can be visibly aligned thru said slots to work with scales 71.

It is apparent that the instrument hereinabove described provides a cylindrical slide-rule computer adapted to perform either all or some of the calculating, measuring, writing and drawing, and magnifying operations associated normally with the use of a slide rule, and to perform these functions with great facility and accuracy by means of the compact device disclosed. In a single, simple, relatively small and compact instrument, a reading magnifier, a linear scale including a depth guage, a slide rule of high accuracy and having multiple scales, a writing and drawing implement available for use at any selected setting of the slide rule, and the additional characteristics hereinabove referred to, are provided. These characteristics are evident, for example, in the case of the sleeve replacement referred to in the beginning, where the field engineer removes the device herein described from its clasped position in his pocket.

The clip-cursor 39 is shifted toward the end of the device so that the magnifier-clasp 51 protrudes beyond, and flat side 53 of the reading magnifier is placed over the usually finely printed handbook tabulation of specific weight, in pounds per cubic inch, of the material to be used. The figure thus read is written down with pencil 17 or 23. Magnifier 51 is then also used to examine the material's condition and worn part number on the old sleeve, which in this case is a wide tolerance part. The outside diameter of the sleeve is measured in inches on one of the scales 13 or 37, which reading is written down with one of pencils 17 or 23. Then the inside diameter is read on the same scale and also written down. The sleeve is stood upright on a flat base-surface with its axis perpendicular thereto, and the tube 35 is extended down and placed inside, snug and parallel to the sleeve wall, with the zero end of the inch scale on said tube butting against the base surface common to tube and sleeve. (In case the sleeve is somewhat longer than tube 35, the zero point for tube 11 at end of pencil 17 is butted against the base surface and tube 35 is extended upward so that its inch markings continue from similar markings on tube 11.) The cursor 39 is reversed, if necessary, and slid along tube 35 so that surface 49 of notch 45 faces downward, flush upon the upper end of the sleeve. The equilevel index line 47 then shows the depth or length of the sleeve in inches on one of scales 37. It is noted down with the exposed pencil 23 or 17, as the case may be.

The above measured outside diameter of sleeve is divided in two by the usual slide rule operation, and using the magnifying acuracy of cursor body 41 and its index 47, the resulting radius is squared, multiplied successively by π and by the guaged length upon appropriate slide rule scales, and the resulting outside sleeve diameter volume is written down with one of exposed pencils 17 or 23. The measured inside diameter of the sleeve is similarly manipulated on the slide rule scales and cursor to give the inside sleeve diameter volume, which is likewise written down. The inside sleeve volume obtained above is set on a combining centimeter-logarithm-decimal scale on tube 11 opposite the outside sleeve volume value set on like scale on tube 35, and the subtractive answer of sleeve actual volume is obtained on said scale on tube 35 opposite the zero mark of said logarithm value scale of tube 11, thus using this scale for simple numerical subtraction. The resulting sleeve volume in cubic inches is then multiplied on the appropriate conventional slide-rule scales 13 and 37 by the specific weight noted in the beginning from the handbook, and the estimated weight of the sleeve in pounds is obtained.

The drafting, chuck-type pencil 23 can then be used in conjunction with eraser 27 to make a sketch or working drawing of the sleeve, with the slidably removable outer tube 35 used as a guiding straight edge. A hard scriber point may be removed from storage in the lead compartment 25 to replace the drafting or writing lead held in pencil chuck 23, in order to mark the metal of the old sleeve, if such mark should be required. Writing unit 15 may be reversed to expose pen 19, which can be used to write a letter ordering the replacement sleeve or to sign requisite papers.

Various modifications and changes can be made in the subject device without departing from the scope of the invention.

I claim:

1. A computer comprising a first tube marked with indicia, a plurality of writing instruments carried by said tube and extending from the ends thereof, said instruments being marked with indicia, and a second transparent tube carried slidably and rotatably on said first tube, said second tube being marked with indicia adapted to be aligned with indicia of said first tube and said instruments.

2. A computer comprising a first tube marked with indicia, a plurality of writing instruments carried by said tube and extending from the ends thereof, said instruments being marked with indicia, a second transparent tube carried slidably and rotatably on said first tube, said second tube being marked with indicia adapted to be aligned with indicia of said first tube and said instruments, and a cursor carried slidably and rotatably on said second tube.

3. A computer comprising a first tube marked with scale indicia, a plurality of writing instruments carried by said tube and extending from the ends thereof, said instruments being marked with like scale indicia, a second transparent tube carried slidably and rotatably on said first tube, said second tube being marked with scale indicia adapted to be aligned with scale indicia of said first tube and said instruments, and a magnifying cursor having a pocket clip portion and a notched edge, said cursor being carried slidably and rotatably on said second tube.

4. A computer comprising a first opaque tube marked with a plurality of scales, a plurality of writing instruments carried slidably and rotatably in said tube, extending from the ends thereof and marked with scales, a second transparent tube substantially coextensive with said first tube carried slidably and rotatably thereon, said second tube being movable without limit relative said first tube and said writing instruments, and being marked with a plurality of scales, selected scales of said first tube and said instruments being adapted to be aligned with selected scales of said second tube, and a magnifying cursor having a magnifying pocket clip portion, an inscribed datum line and a notched edge aligned with said datum line carried slidably and rotatably on said second tube.

5. A computer comprising a first opaque tube marked with a plurality of scales, a plurality of writing instruments carried slidably and rotatably in said tube, extending from the ends thereof and marked with scales, a second transparent tube substantially coextensive with said first tube carried slidably and rotatably thereon, at least one of said first and second tubes being resilient and non-circular in cross-section, said second tube being movable without limit relative said first tube and said writing instruments, and being marked with a plurality of scales, selected scales of said first tube and said instruments being adapted to be aligned with selected scales of said second tube, and a magnifying cursor having a magnifying pocket-clip portion, an inscribed datum line, and a notched edge aligned with said datum line carried slidably and rotatably on said second tube.

6. A computer comprising a first apaque tube marked with a plurality of scales extending longitudinally thereon, a plurality of writing instruments inscribed with scales carried slidably, rotatably, and reversibly in said tube and extending from the ends thereof, means to limit retraction of said instruments into said tube, a second transparent tube substantially coextensive with said first tube carried slidably, rotatably and reversibly thereon, at least one of said first and second tubes being resilient and non-circular in cross-section, said second tube being movable without limit relative said first tube and said writing instruments and being marked with a plurality of scales, selected scales of said first tube and said instruments being adapted to be aligned with selected scales of said second tube, and a magnifying cursor having a mignifying pocket clip portion, an inscribed datum line, and a notched edge aligned with said datum line carried slidably, rotatably and reversibly on said second tube.

7. A computer comprising a first opaque tube marked with a plurality of scales extending longitudinally thereon, a plurality of writing instruments inscribed with scales carried slidably, rotatably and reversibly in said tube and extending from the ends thereof, means to limit retraction of said instruments into said tube, a second longitudinally slotted tube substantially coextensive with said first tube carried slidably, rotatably and reversibly thereon, at least one of said first and second tubes being resilient and non-circular in cross-section, said second tube being movable without limit relative said first tube and said writing instruments and being marked adjacent the slots with a plurality of scales, selected scales of said first tube and said instruments being adapted to be aligned with selected scales of said second tube, and a magnifying cursor having a magnifying pocket clip portion, an inscribed datum line, and a notched edge aligned with said datum line carried slidably, rotatably and reversibly on said second tube.

8. A computer comprising a first opaque tube marked with a plurality of scales extending helically thereon, a plurality of writing instruments inscribed with scales carried slidably, rotatably and reversibly in said tube and extending from the ends thereof, means to limit retraction of said instruments into said tube, a second transparent tube substantially coextensive with said first tube carried slidably, rotatably and reversibly thereon, at least one of said first and second tubes being resilient and non-circular in cross-section, said second tube being movable without limit relative said first tube and said writing instruments and being marked with a plurality of scales, selected scales of said first tube and said instruments being adapted to be aligned with selected scales of said second tube, and a magnifying cursor having a magnifying pocket clip portion, an inscribed datum line, and a notched edge aligned with said datum line carried slidably, rotatably and reversibly on said second tube.

9. A computer comprising a first opaque tube marked with a plurality of scales extending helically thereon, a plurality of writing instruments inscribed with scales carried slidably, rotatably and reversibly in said tube and extending from the ends thereof, means to limit retraction of said instruments into said tube, a second helically slotted tube substantially coextensive with said first tube carried slidably, rotatably and reversibly thereon, at least one of said first and second tubes being resilient and non-circular in cross-section, said second tube being movable without limit relative said first tube and said writing instruments and being marked adjacent the said slots with a plurality of scales, selected scales of said first tube and said instruments being adapted to be aligned with selected scales of said second tube, and a magnifying cursor having a magnifying pocket clip portion, an inscribed datum line, and a notched edge aligned with said datum line carried slidably, rotatably and reversibly on said second tube.

10. A computer comprising a first opaque tube marked with a plurality of first scales, a plurality of writing instruments marked with a plurality of second scales having a predetermined mathematical relation to said first scales, said instruments being carried slidably, rotatably and reversibly in said tube and extending from the ends thereof, means to limit retraction of said instruments into said tube, a second transparent tube substantially coextensive with said first tube carried slidably, rotatably and reversibly thereon, at least one of said first and second tubes being resilient and non-circular in cross-section, said second tube being movable without limit relative said first tube and said writing instruments and being marked with a plurality of scales having a predetermined mathematical relation to said first and second scales, selected first and second scales being adapted to be aligned with selected scales of said second tube, and a split torus magnifying cursor having a magnifying pocket clip depending therefrom and an inscribed datum line carried slidably, rotatably and reversibly on said second tube.

11. A computer comprising a first tube marked with indicia and having a bore in each end thereof adapted to carry a writing instrument, a second transparent tube carried slidably and rotatably on said first tube, said second tube being marked with indicia adapted to be aligned with indicia of said first tube, and a magnifying cursor having a magnifying pocket clip portion, an inscribed datum line and a notched edge aligned with said datum line carried slidably and rotatably on said second tube.

12. A computer comprising a first tube marked with indicia and having a bore in each end thereof adapted to carry a writing instrument, a second transparent tube carried slidably and rotatably on said first tube, said second tube being marked with indicia adapted to be aligned with indicia of said first tube, and a cursor having a magnifying pocket clip portion, an inscribed datum line and a notched edge aligned with said datum line carried slidably and rotatably on said second tube.

13. In a slide rule having a substantially cylindrical body portion, a cursor comprising a transparent, magnifying, split-toroidal-shaped clamp portion adapted to clasp about and to be slidable and rotatable relative such body portion, said clamp portion having an inscribed datum line and a notched edge aligned with said datum line, and a dependent, magnifying pocket-clip portion adapted to lie proximate such body portion and to extend substantially parallel to the longitudinal axis of such body portion.

14. In a computer having a tubular body portion, a cursor comprising a transparent substantially-toroidal-shaped magnifying split clamp portion adapted to clamp upon and to be movable relative such body portion, said clamp portion having a datum line, and a dependent, pocket-clip portion adapted to lie proximate such body portion and to extend substantially parallel to the longitudinal axis of such body portion.

15. In a computer having a tubular body portion, a cursor comprising a prehensile clamp portion adapted to clamp upon and to be movable relative such body portion, said clamp portion having a datum line and a dependent, magnifying pocket-clip portion adapted to lie proximate such body portion and to extend substantially parallel to the longitudinal axis of such body portion.

References Cited in the file of this patent

UNITED STATES PATENTS

| | | |
|---|---|---|
| 181,179 | Johnson | Aug. 15, 1876 |
| 996,039 | Keuffel | June 20, 1911 |
| 1,260,638 | Carlson | Mar. 26, 1918 |
| 1,598,600 | Butterfield | Sept. 7, 1926 |
| 1,600,214 | Butterfield | Sept. 21, 1926 |
| 1,645,009 | King | Oct. 11, 1927 |
| 1,683,485 | Rall | Sept. 4, 1928 |
| 1,959,636 | Obidine | May 22, 1934 |
| 2,403,382 | Lerner | July 2, 1946 |
| 2,412,820 | Magee | Dec. 17, 1946 |
| 2,526,408 | Posson | Oct. 17, 1950 |

FOREIGN PATENTS

| | | |
|---|---|---|
| 337,487 | Great Britain | Nov. 6, 1930 |
| 23,968 | Great Britain | Dec. 12, 1914 |
| 368,186 | Italy | Feb. 10, 1939 |
| 612,218 | France | July 26, 1926 |

OTHER REFERENCES

Slide rule which resembles that of the applicant and shown on page 268 of the August 1952 edition of "Popular Mechanics," published by Popular Mechanics Co., of 200 E. Ontario Street, Chicago, Illinois.